(12) United States Patent
Yasooka et al.

(10) Patent No.: US 9,553,285 B2
(45) Date of Patent: Jan. 24, 2017

(54) BATTERY REINFORCEMENT METHOD

(71) Applicants: Nissan Motor Co., Ltd., Yokohama-shi, Kanagawa (JP); Automotive Energy Supply Corporation, Zama-shi, Kanagawa (JP)

(72) Inventors: Takeshi Yasooka, Yamato (JP); Mitiyuki Tezuka, Yukuhashi (JP)

(73) Assignees: Nissan Motor Co., Ltd., Yokohama (JP); Automotive Energy Supply Corporation, Zama (JP)

( * ) Notice: Subject to any disclaimer, the term of this patent is extended or adjusted under 35 U.S.C. 154(b) by 0 days.

(21) Appl. No.: 14/376,649

(22) PCT Filed: Feb. 13, 2013

(86) PCT No.: PCT/JP2013/053381
§ 371 (c)(1),
(2) Date: Aug. 5, 2014

(87) PCT Pub. No.: WO2013/122097
PCT Pub. Date: Aug. 22, 2013

(65) Prior Publication Data
US 2015/0026969 A1    Jan. 29, 2015

(30) Foreign Application Priority Data
Feb. 13, 2012    (JP) ................. 2012-028515

(51) Int. Cl.
*H01M 2/08* (2006.01)
*H01M 2/06* (2006.01)
*H01M 2/02* (2006.01)

(52) U.S. Cl.
CPC ............. *H01M 2/08* (2013.01); *H01M 2/0207* (2013.01); *H01M 2/0267* (2013.01); *Y10T 29/4911* (2015.01)

(58) Field of Classification Search
CPC ............. H01M 2/08; H01M 2/02; H01M 2/06
See application file for complete search history.

(56) References Cited

U.S. PATENT DOCUMENTS

| | | | |
|---|---|---|---|
| 6,777,130 B2 * | 8/2004 | Kasahara | H01M 2/0202 429/164 |
| 2009/0081542 A1 * | 3/2009 | Yageta | H01G 9/08 429/185 |

(Continued)

FOREIGN PATENT DOCUMENTS

| | | |
|---|---|---|
| CN | 102208673 A | 10/2011 |
| EP | 2375469 A1 | 10/2011 |

(Continued)

*Primary Examiner* — Patrick Ryan
*Assistant Examiner* — Zhongqing Wei
(74) *Attorney, Agent, or Firm* — Global IP Counselors, LLP

(57) ABSTRACT

A battery reinforcement method for reinforcing a rectangular battery cell in which a battery element is disposed in a rectangular external packaging, the method includes enclosing the battery element between two rectangular external packaging sheets and sealing the rectangular external packaging sheets with a sealing part that extends along edges of the rectangular external packaging sheets so as to form the rectangular external packaging, and forming a reinforcing part outside of the sealing part on the rectangular external packaging.

15 Claims, 8 Drawing Sheets

(56) References Cited

U.S. PATENT DOCUMENTS

| | | | | |
|---|---|---|---|---|
| 2009/0125251 A1* | 5/2009 | Caretta et al. | ............... | 702/42 |
| 2009/0169977 A1* | 7/2009 | Sfarzo | ............... | H01M 6/5044 |
| | | | | 429/50 |
| 2009/0274957 A1* | 11/2009 | Goda | ............... | H01M 2/02 |
| | | | | 429/164 |
| 2010/0129705 A1* | 5/2010 | Gutsch | ............... | H01M 2/0262 |
| | | | | 429/163 |
| 2011/0244315 A1* | 10/2011 | Yoon | ............... | H01M 2/0207 |
| | | | | 429/176 |

FOREIGN PATENT DOCUMENTS

| | | | | | |
|---|---|---|---|---|---|
| GB | 2087779 A | * | 6/1982 | ........... | B23D 31/001 |
| JP | 7-183357 A | | 7/1995 | | |
| JP | 2005-347123 A | | 12/2005 | | |
| JP | 2010-198988 A | | 9/2010 | | |
| JP | 2010198988 A | * | 9/2010 | ........... | H01M 10/04 |
| JP | 2012-204002 A | | 10/2012 | | |
| WO | 2006/098242 A1 | | 9/2006 | | |

\* cited by examiner

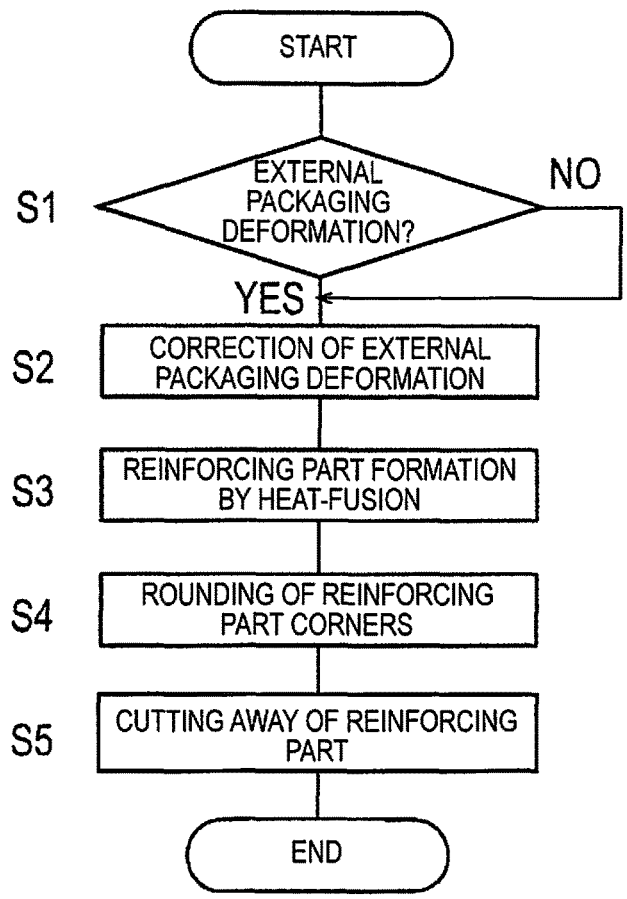
FIG. 6
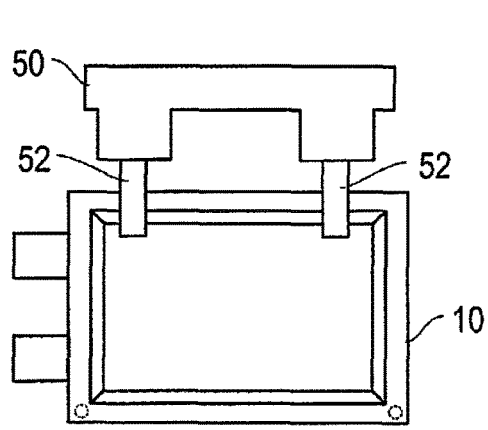
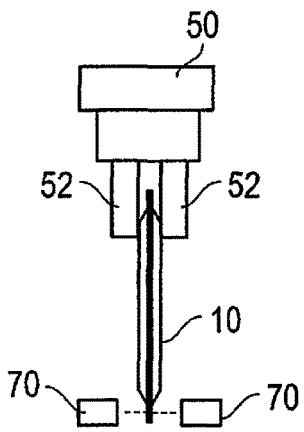
FIG. 7A  FIG. 7B

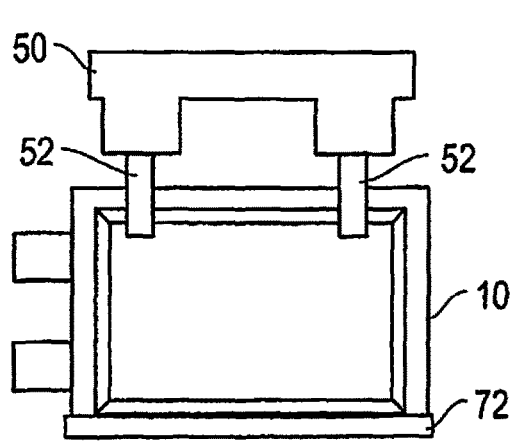
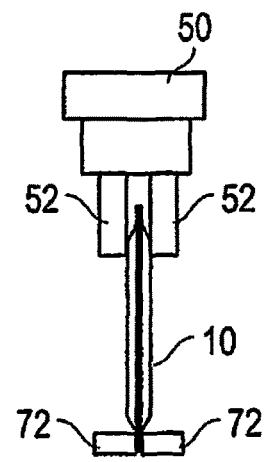
FIG. 8A  FIG. 8B
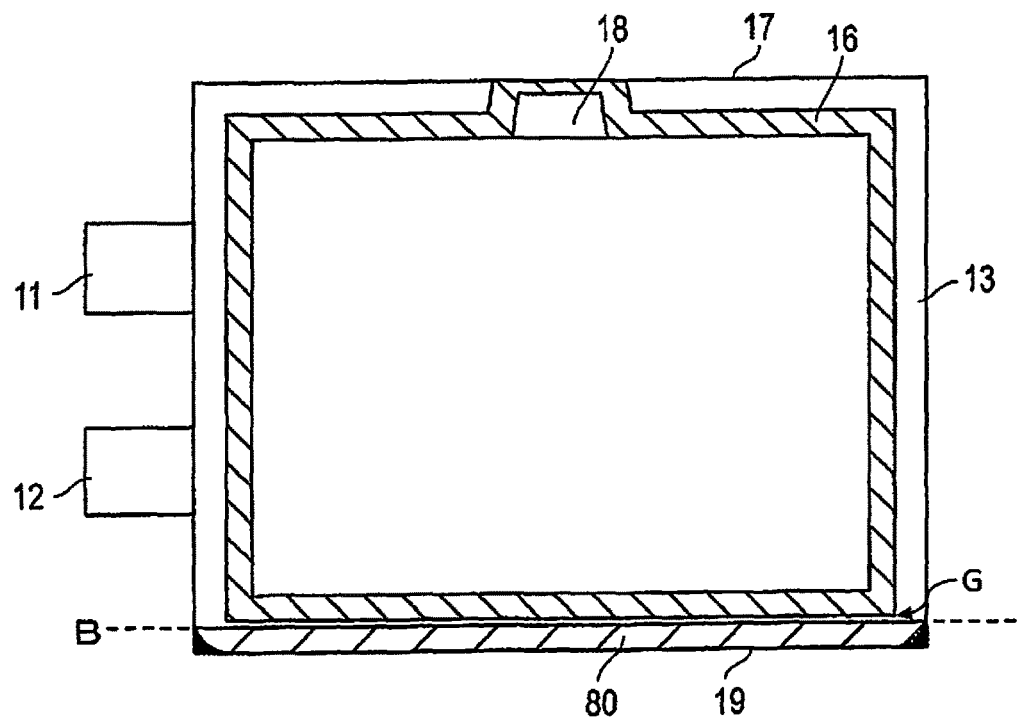
FIG. 9

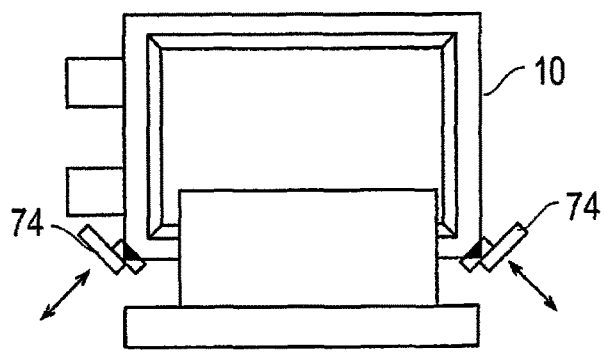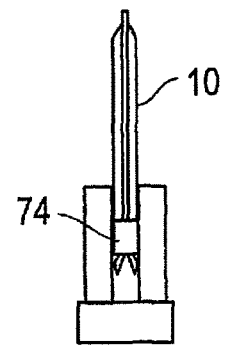
FIG. 10A  FIG. 10B
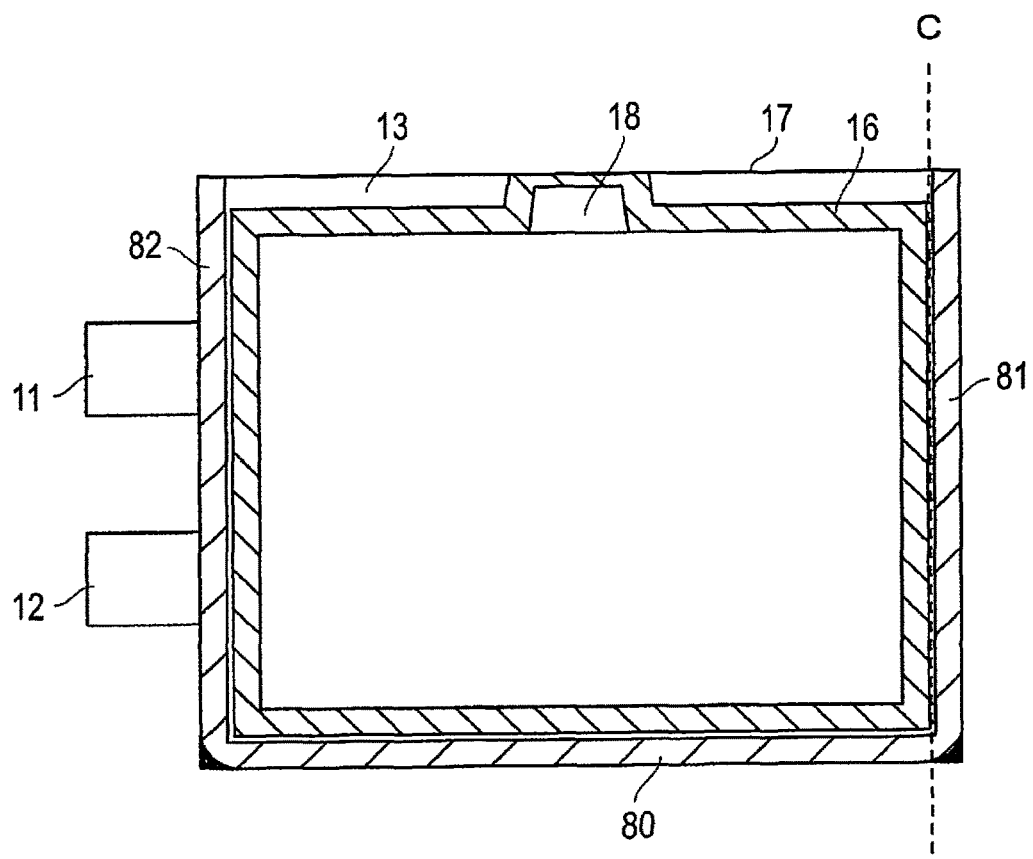
FIG. 11

BATTERY REINFORCEMENT METHOD

CROSS-REFERENCE TO RELATED APPLICATIONS

This application is a U.S. National stage application of International Application No. PCT/JP2013/053381, filed Feb. 13, 2013, which claims priority to Japanese Patent Application No. Japanese Patent Application 2012-028515 filed in Japan on Feb. 13, 2012, the contents of each of which are hereby incorporated herein by reference.

BACKGROUND

Field of the Invention

The present invention relates to a battery reinforcement method.

Background Information

Conventional systems are known in which multiple workpieces are stored in a rack, and the pitch of the multiple workpieces that are arranged in the rack is adjusted in accordance with the workpiece treatment step (for example, refer to Japanese Laid-Open Patent Application No. 7-183357). With the invention according to Japanese Laid-Open Patent Application No. 7-183357, the workpieces are substrates, and the workpieces are held in grooves that are formed in a substrate holding member in which the ends of the substrates fit.

On the other hand, with steps that involve processing battery cells, multiple battery cells are stored in the rack and are taken out and transported after adjusting the pitch, as necessary.

SUMMARY

However, with battery cells, for example, the external packaging is formed from a laminate that is produced by coating an aluminum sheet with resin, and so the ends of the external packages are not as hard as the substrates. Consequently, when the method according to Japanese Laid-Open Patent Application No. 7-183357 is used, and a battery cell is fit into a groove in the holding member, there is the risk that the external packaging will be damaged.

Even if the workpiece is not held in a state of fitting into the groove of the holding member as in Japanese Laid-Open Patent Application No. 7-183357, there is the risk that the external packaging of the battery cell will be damaged when the battery cell is stored in and removed from the predetermined rack or the like.

The present invention was developed in light of such circumstances, and it is an object of the invention to provide a battery reinforcement method for reinforcing the ends of battery cells so as to prevent damage.

The battery reinforcement method is a method for reinforcing a rectangular battery cell in which a battery element is disposed in a rectangular external packaging. The external packaging is formed by enclosing the battery element between two rectangular external packaging sheets and sealing the resulting assembly with a sealing part that runs along each of the sides of the rectangular form. The battery reinforcement method includes a step in which a reinforcing part is formed to the outside of the sealing part in the external packaging.

With the battery reinforcement method, a reinforcing part is formed to the outside, separate from a sealing part. Consequently, the sealing part can be protected by the reinforcing part during battery cell transport or the like.

BRIEF DESCRIPTION OF THE DRAWINGS

Referring now to the attached drawings which form a part of this original disclosure.

FIG. 6 is a flow chart showing the sequence of the battery reinforcement method.

FIGS. 7A and 7B are diagrams showing the elements involving in checking for deformation of the battery cell.

FIGS. 8A and 8B are diagrams showing the elements involved in forming the reinforcing part.

FIG. 9 is a diagram showing the reinforcing part that is formed in the battery cell.

FIGS. 10A and 10B are diagrams showing the elements involved in rounding the reinforcing part.

FIG. 11 is a diagram showing an additional battery cell in which a reinforcing part has been formed.

DETAILED DESCRIPTION OF THE EMBODIMENTS

Figure 1:
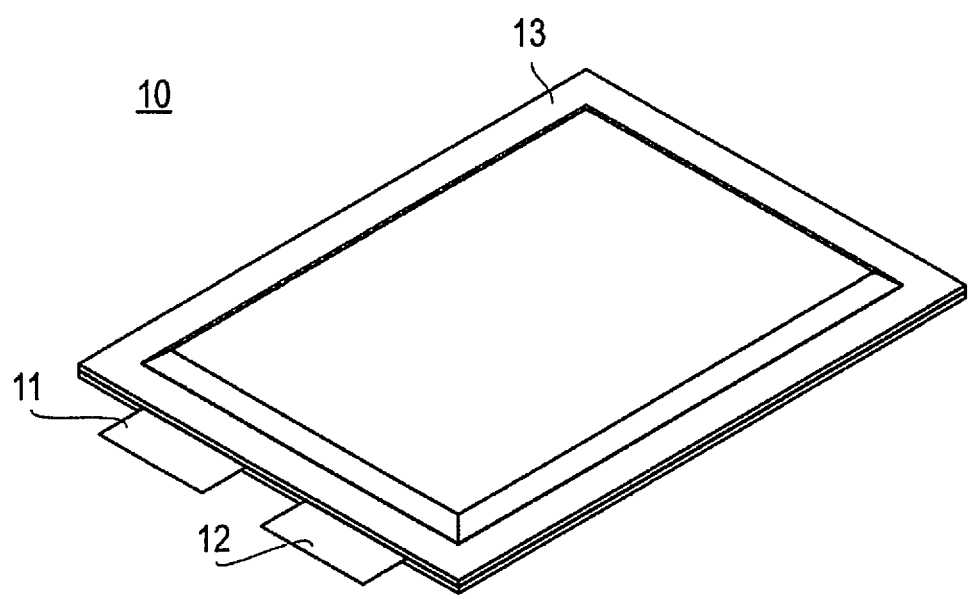
FIG. 1 is a perspective view showing the exterior of the battery cell.

Embodiments of the present invention are described below with reference to the accompanying drawings. In the descriptions of the drawings, the same symbols refer to the same elements, and duplicate descriptions are thus not made. The dimensional ratios in the drawings may be exaggerated in order to aid in description and thus may differ from the true ratios in some instances.

The present invention relates to a battery reinforcement method for reinforcing a battery cell. The configuration of the battery that is to be reinforced will be described prior to describing the battery reinforcement method.

(Battery)

Figure 2:
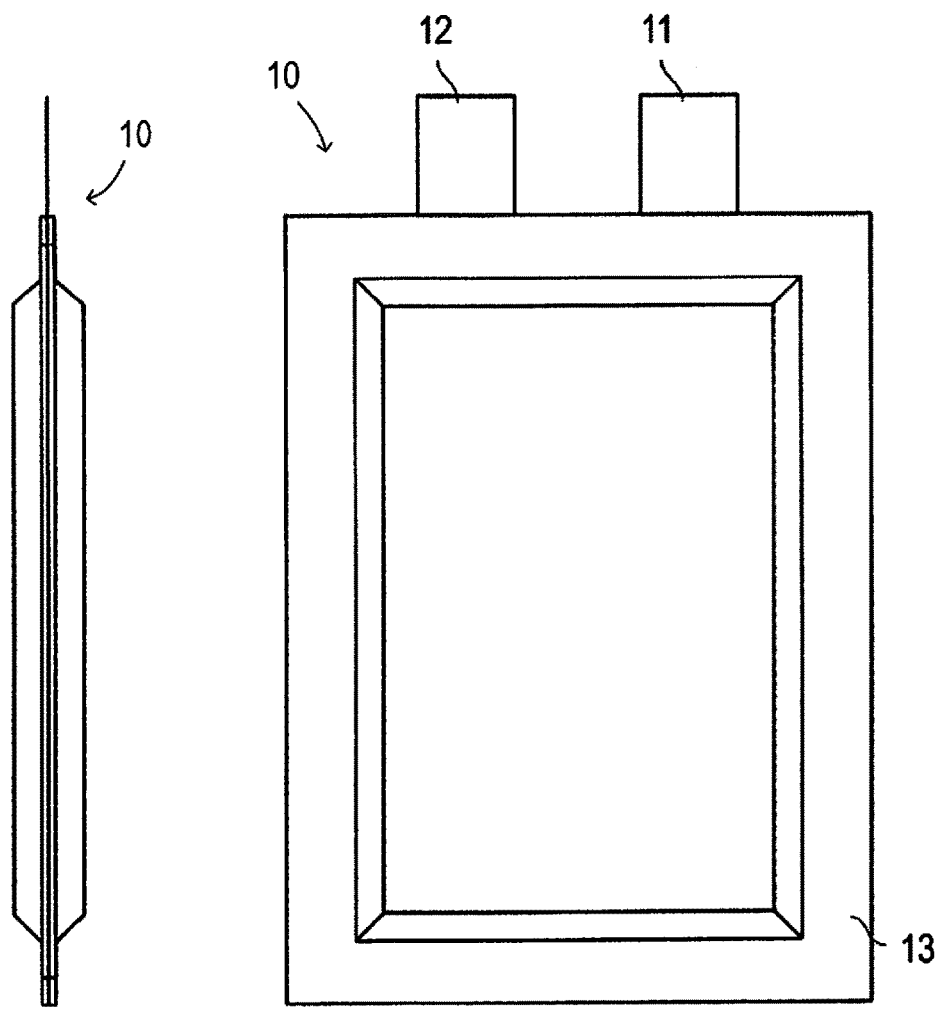
FIGS. 2A, 2B and 2C are diagrams showing an end view, a plan view and side view of the battery cell.
Figure 3:
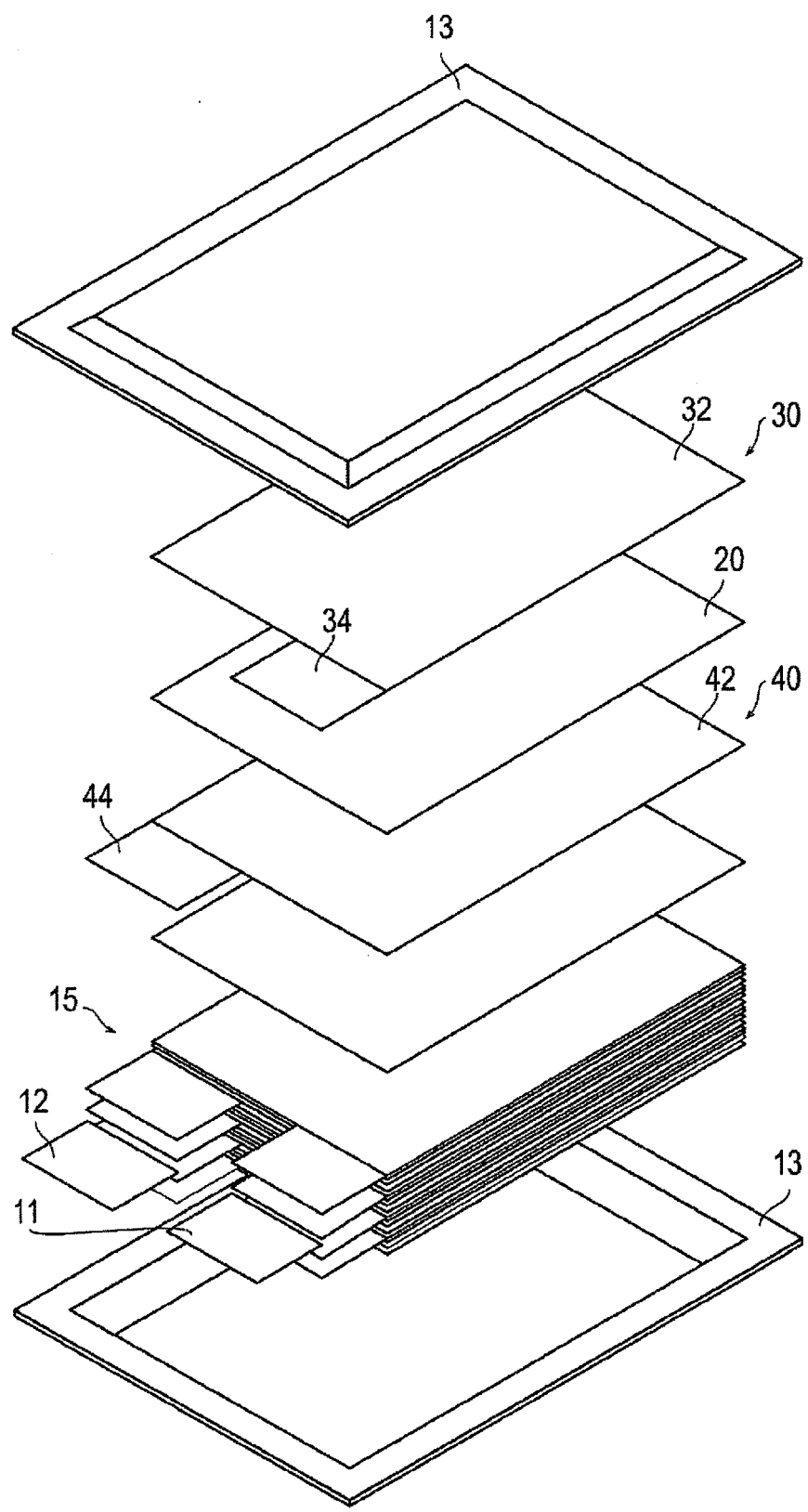
FIG. 3 is an exploded perspective view of the battery cell.

FIG. 1 is a perspective view showing the exterior of a battery cell. FIGS. 2A, 2B and 2C are diagrams showing an end view, a plan view and a side view of the battery cell. FIG. 3 is an exploded perspective view of the battery cell.

As shown in FIG. 1, FIG. 2A, FIG. 2B and FIG. 2C, the battery cell 10 has a flattened rectangular shape, with a positive electrode lead 11 and a negative lead 12 exiting from the same end of an external packaging 13. The external packaging 13, for example, is produced by applying a resin coating to the surface of an aluminum sheet.

As shown in FIG. 3, the interior of the external packaging 13 contains electrolyte and an electricity-generating element (battery element) 15 whereby the charging and discharging reactions occur. The electricity-generating element 15 is formed by alternately layering positive electrodes 30 and negative electrodes 40, with sheet-form separators 20 interposed therebetween. In some cases, air, gas, or the like remains in the battery element 15 (separator 20) after the electricity-generating element 15 has been disposed in the external packaging 13, or after the electrolyte has been added.

With the positive electrodes 30, a positive active substance layer 32 is formed on both surfaces of a sheet-form positive electrode collector. The positive active substance layer 32 is not formed on the tab portions 34 of the positive electrodes 30. The respective tab portions 34 of the positive electrodes 30 are disposed at overlapping positions as seen from the layering direction in the electricity-generating element 15. The tab portions 34 connect with a positive electrode lead 11.

With the negative electrodes 40, a negative electrode active substance layer 42 is formed on both surfaces of a sheet-form negative electrode collector. The negative active substance layer 42 is not formed on the tab portions 44 of the negative electrodes 40. The respective tab portions 44 of the negative electrodes 40 are disposed at overlapping positions as seen from the direction of layering of the electricity-generating element 15 and are disposed so as not to overlap with the tab portions 34 of the positive electrodes 30. The tab portions 44 are connected to a negative electrode lead 12.

Figure 4:
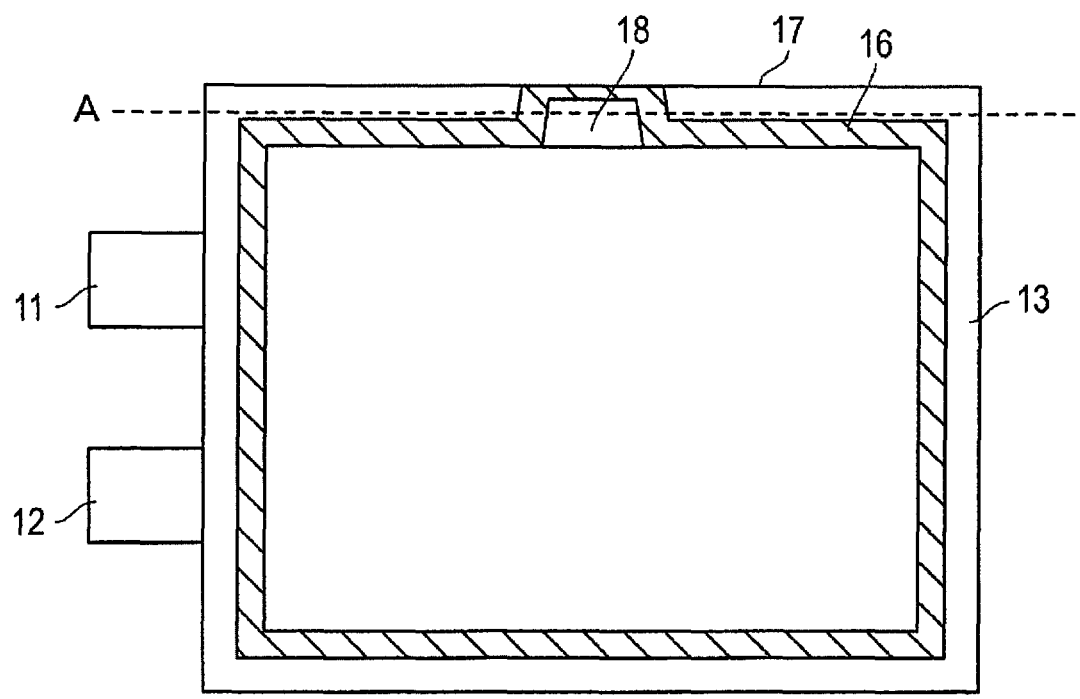
FIG. 4 is a diagram showing the sealing part inside the battery cell.

FIG. 4 is a diagram showing the reinforcing part in the battery cell. The sealing part 16 indicated by the slanted lines in the drawing is shown for purposes of describing its position, but cannot actually be seen from outside the battery cell 10.

The external packaging 13 of the battery cell 10 contains a battery element 15 between two sheets of rectangular laminated sheets (external packaging sheets). The packaging is formed so as to be sealed by a sealing part 16 that runs along each side of the rectangular form. For example, in the region indicated by the slanted lines in FIG. 4, the two laminated sheets of the external packaging 13 are adhered together, forming a sealing part 16. Adhesion of the external packaging 13 can be achieved, for example, by heat-fusing of the resin that coats the external packaging 13 or by adhesion using an adhesive. The sealing part 16 is formed at a location that is at a prescribed separation from each edge of the battery cell 10. Specifically, the sealing part is smaller all around than the external shape of the battery cell 10. However, on one side 17 of the battery cell 10, the sealing part 16 is formed in an outwardly protruding shape so as to approach the edge of the side 17. With the side 17, one edge of the battery cell 10 is used as a gas extraction opening 18 for discharging air or gas in the external packaging 13. An edge portion on the side 17 of the battery cell 10 is cut off at the location indicated by the dotted line A in the drawing, and when this is done, the gas extraction opening 18 passes through the inner and outer parts of the external packaging 13. Gas or the like in the external packaging 13 is discharged through the gas extraction opening 18. Subsequently, the external packaging 13 is adhered in the portion of the gas extraction opening 18, thereby resealing the battery cell 10.

The elements involved in transporting and storing the battery cells 10 will now be described.

Figure 5A:
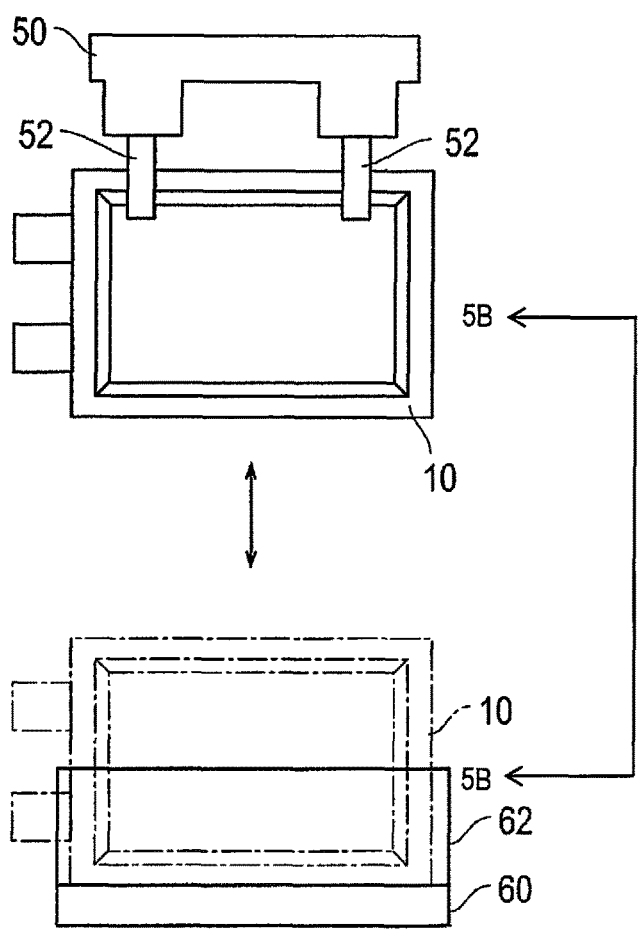
FIGS. 5A and 5B are diagrams showing the elements involved in transporting and carrying the battery cell.
Figure 5B:
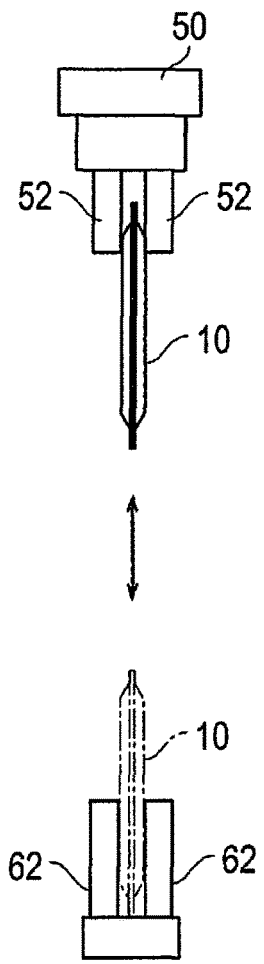

FIGS. 5A and 5B are diagrams showing the elements involved in transport and carrying of the battery cell. FIG. 5(A) shows a plan view of the elements of the battery cell 10. FIG. 5(B) shows the elements as viewed from the direction of the arrow 5B in FIG. 5(A).

As shown in FIGS. 5A and 5B, the battery cell 10 is transported by a transport device 50. The transport device 50 in this embodiment transports the battery cell 10 through the air with the battery cell suspended in a state in which the short side of the rectangular form of the battery cell 10 is standing vertically. The transport device 50, for example, is a transport robot that transports the battery cell by sandwiching the upper part of the flat surface of the battery cell 10 from both sides with gripping parts 52.

The transport device 50 transports the battery cells 10 to various processing or treatment steps, transfers the battery cells 10 to other devices, and removes the battery cells from other devices. Examples of other devices include receiving stands for temporarily carrying the battery cells 10, storage devices for storing the battery cells 10, and transport devices for transporting the battery cells 10 that employ methods other than those of the transport device 50. Alternatively, these may be processing devices or processing stands for carrying out prescribed processes on the battery cells 10. A case is described below in which the battery cell 10 is transferred to a receiving stand 60 shown in the bottom of the drawing.

The receiving stand 60 has a support part 62 that supports the battery cell 10 from both surfaces. The battery cell 10 is transported over the receiving stand 60 by the transport device 50, and the battery cell 10 is inserted between the supports parts 62 of the receiving stand 60 when the transport device 50 approaches the receiving stand 60. When the transport device 50 releases the gripping parts 52, the battery cell 10 is stored in the receiving stand 60. When the battery cell 10 is to be removed from the receiving stand 60, the transport device 50 approaches the receiving stand 60 and the battery cell 10 is gripped by the gripping parts 52. By raising the transport device 50, the battery cell 10 is removed from the receiving stand 60.

As described above, in this embodiment, the battery cell 10 is transported with the gas extraction opening 18 positioned upward and is stored in the receiving stand 60 from the opposite edge from the gas extraction opening 18. Consequently, the edge of the battery cell 10 opposite the gas extraction opening 18 often contacts other devices such as the receiving stand 60.

(Battery Reinforcement Method)

The method for reinforcing the battery cell 10 in the state prior to opening of the gas extraction opening 18, i.e., the state shown in FIG. 4, is described in detail below.

FIG. 6 is a flow chart showing the sequence of the battery reinforcement method. FIGS. 7A and 7B are diagrams showing the elements involved in checking battery cell deformation. FIGS. 8A and 8B are diagrams showing the elements involved in forming the reinforcing part. FIG. 9 is a diagram showing the reinforcing part formed in the battery cell. FIGS. 10A and 10B are diagrams showing the elements involved in rounding the reinforcing part.

First, the battery cell 10 is transported by the transport device 50 to a prescribed position, and a check is performed to determine whether there is deformation such as bending at locations on the battery cell 10 to be reinforced (step S1). The sensor 70 shown in FIG. 7B detects deformation. The sensor 70, for example, is a pair of photoelectric sensors which can check for deformation of the external packaging 13 of the battery cell 10 by using one to detect the amount of light that has been emitted from the other. The external packaging 13, as shown in FIG. 4, often contacts other devices at the side that is positioned downward in the drawing, and, in particular, is often deformed at the corners. Consequently, for example, it is desirable to detect bending at the corner portions of the external packaging 13 represented by the dotted lines in FIGS. 7A and 7B.

When bending of the external packaging 13 is detected by the sensor 70 (step S1: YES), deformation is corrected (step S2). Bend correction, for example, involves a pressing roller that evens out the external packaging 13 by pressing the external packaging 13 so as to cause the external packaging 13 to be perfectly straight. However, deformation of the external packaging 13 may be corrected by any method.

Next, if no bending is found (step S1: NO), or when bending has been corrected (step S2), the battery cell 10 is then subjected to reinforcing part formation (step S3). When forming the reinforcing part, as shown in FIGS. 8A and 8B, the lower part of the external packaging 13 of the battery cell 10 is thermally fused by a heat-fusing device 72. The heat-fusing device 72 has a pair of blocks that abut the part of the external packaging 13 where the reinforcing part is to be formed, pressing it while heating from both sides, thereby fusing the resin of the external packaging 13. As shown in FIG. 9, the reinforcing part 80 is formed outwards from the sealing part 16 of the battery cell 10 on an side 19 that is different from the side 17 on which the gas extraction opening 18 has been formed. Thus, a gap G is formed between the sealing part 16 and the reinforcing part 80. Although the sealing part 16 that seals the external packaging 13 can be formed by heat-fusing, the reinforcing part 80 can be formed by heat-fusing with a different degree of precision than used for the sealing part 16. For example, the sealing part 16 can be formed by high-precision heat-fusing, whereas the reinforcing part 80 can be formed by comparatively low-precision heat-fusing.

Next, the corners of the reinforcing part 80 that has been formed in the battery cell 10 are rounded (step S4). The reinforcing part 80, as shown in FIGS. 10A and 10B, is rounded using scissors 74. The scissors 74 approach the corners of the battery cell 10 that is carried on the receiving stand 60 or the like, and the corners are cut off. The portions drawn in black in FIGS. 9, 10A and 10B are cut away.

After step S4, the battery cell 10 is transported to various devices for processing or the like. At this time, the battery cell 10 is placed in and removed from the receiving stand 60 or storage. After completion of the primary and other processes for the battery cell 10, but prior to shipping the battery cell 10 product, the reinforcing part 80 is cut away from the battery cell 10 (step S5). The reinforcing part 80 is cut away at the location indicated by the dotted line B in FIG. 9.

As described above, in this embodiment, a reinforcing part 80 is formed on the side 19 that is different from the side 17 on which has been formed the gas extraction opening 18 that is used for gas discharge. The side 19, which is not the side 17 as described above, often comes into contact with other devices such as transport devices 50 or receiving stands 60 when transporting the battery cell 10 or when supporting the battery cells for processing. Consequently, by reinforcing the side 19, deformation of the external packaging 13 of the battery cell 10 due to contact with other devices can be prevented. In addition, the reinforcing part 80 can be formed without the addition of other members, and so the prevention of deformation can be realized at low cost without excess costs required for the reinforcing part 80.

In addition, the reinforcing part 80 is formed outwards and separately from the laminated sheet sealing part 16 of the external packaging 13. Consequently, the reinforcing part 80 can be formed with different standards or at a different precision from the sealing part 16. Because the reinforcing part 80 is formed separate from the sealing part 16, the sealing part 16 can be protected by the reinforcing part 80 during transport of the battery cell 10 or in other circumstances.

Formation of the sealing part 16 and the reinforcing part 80 can be achieved separately from the other by heat-fusing of the resin on the laminated sheet. Consequently, the sealing part 16 and the reinforcing part 80 can be formed separately using laminated sheets having the same configuration.

In addition, because deformation of the external packaging 13 is corrected prior to formation of the reinforcing part 80, it is possible to prevent unnecessary curling or creasing at the sides caused by forming the reinforcing part 80 with the sides of the external packaging 13 having been deformed.

Prior to forming the reinforcing part 80, deformation of the external packaging 13 is checked with the sensor 70, and thus deformation of the side can be reliably detected.

The reinforcing part 80 is formed on the side 19 of the battery cell 10 that is in contact with other devices such as the receiving stand 60. Thus, deformation of the external packaging 13 of the battery cell 10 due to contact with other devices can be prevented.

Because the side 19 that has been reinforced by the reinforcing part 80 has rounded corners, distribution of load to the corners and deformation of the side 19 can be prevented when the battery cell 10 is inserted from the reinforced side 19 into other devices such as a receiving stand 60.

The reinforcing part 80 is provided during such a step as processing of the battery cell 10 such that deformation of the external packaging 13 of the battery cell 10 is prevented, with the reinforcing part 80 being then cut away in the end. Consequently, although the reinforcing part 80 may incur some scratching during the processing or other steps while reinforcing the battery cell, the reinforcing part will not remain on the battery cell 10 in the final product. A battery cell 10 is thus obtained that has absolutely no scratching.

The present invention was described above in relation to embodiments, but the present invention is not limited to these embodiments, as various modifications are possible.

FIG. 11 is a diagram showing a battery cell in which another reinforcing part has been formed.

In the embodiments described above, the reinforcing part 80 was formed along an side 19 of the battery cell 10, but the invention is not limited thereby. As shown in FIG. 11, reinforcing parts 81, 82 may be formed on the sides that stand vertically. The method for forming the reinforcing parts 81, 82 may be the same as described above, i.e., formation by thermocompression-bonding of the resin in the laminated sheets. Prior to shipping the battery cell 10, the reinforcing part 81 may be cut off at the location indicated by the dotted line C. In FIG. 11, a reinforcing part 82 was formed also on the side where the positive lead 11 and the negative lead 12 exit, but the reinforcing part 82 may remain as it cannot be cut off. The positive electrode lead 11 and the like are present on the same side as the reinforcing part 82, and excessive damage will not occur, so there will not be any problems with leaving the reinforcing part 82.

In addition, in the embodiment described above, an example was described in which the battery cell 10 was carried on the receiving stand 60, and the battery cell 10 was removed from the receiving stand 60, but such an arrangement is not provided by way of limitation. Reinforcement of the battery cell 10 is also effective in cases where a plurality of the battery cells 10 are transferred to and removed from a storage rack that stores multiple battery cells 10.

The invention claimed is:

1. A battery reinforcement method for reinforcing a rectangular battery cell in which a battery element is disposed in a rectangular external packaging, the method comprising:

enclosing the battery element between two rectangular external packaging sheets and sealing the rectangular external packaging sheets with a sealing part that extends around an entire circumference of the battery element so as to form the rectangular external packaging, the rectangular external packaging having at least four sides, each of the sides having an edge, the sealing part being separated from the edges of at least three of the sides such that the sealing part is disposed between the battery element and the edges of the at least three sides of the rectangular external packaging;

forming a reinforcing part on at least one of the at least three sides of the rectangular external packaging such that an elongated gap exists between the sealing part and the reinforcing part, the reinforcing part being located in a region between the sealing part and the edge of the at least one of the at least three sides of the rectangular external packaging from which the sealing part is separated, the gap extending parallel to the edge of the at least one of the at least three sides such that the reinforcing part is separated from the sealing part by the gap and does not overlap the sealing part;

forming each of the two rectangular external packaging sheets by coating a metal sheet with a resin; and forming the sealing part and reinforcing part independently from each other by thermocompression-bonding the resin that coats the two external packaging sheets.

2. The battery reinforcement method according to claim 1, wherein the forming the reinforcing part includes forming the reinforcing part on at least a part of a first side among the sides of the rectangular external packaging, the first side being different from a second side among the sides of the rectangular external packaging that is used for discharging gas.

3. The battery reinforcement method according claim 1, further comprising correcting deformation of the region in which the reinforcing part is to be formed, the forming the reinforcing part being performed such that the reinforcing part spans fully to the edge of the at least one of the at least three of the sides of the rectangular external packaging, and the correcting deformation being performed prior to the forming the reinforcing part.

4. The battery reinforcement method according to claim 3, further comprising detecting deformation of the region in which the reinforcing part is to be formed, the detecting deformation being performed prior to the forming the reinforcing part.

5. The battery reinforcement method according to claim 1, wherein the forming of the reinforcing part being performed such that the reinforcing part spans fully to the edge of one of the at least three sides of the rectangular external packaging, the one side being a side that is in contact with a device when the battery cell is transferred to or received from the device.

6. The battery reinforcement method according to claim 1, wherein the forming the reinforcing part being performed such that the reinforcing part spans fully to the edge of the at least one of the at least three of the sides of the rectangular external packaging, and the forming the reinforcing part including rounding corners of at least one side on which the reinforcing part has been formed.

7. The battery reinforcement method according to claim 6, further comprising cutting a portion of the at least one side on which the reinforcing part has been formed.

8. The battery reinforcement method according claim 2, further comprising correcting deformation of a portion of at least the first side on which the reinforcing part is to be formed, the forming the reinforcing part being performed such that the reinforcing spans fully to the edge of the first side of the rectangular external packaging, and the correcting deformation being performed prior to the forming the reinforcing part.

9. The battery reinforcement method according to claim 8, further comprising detecting deformation of the region in which the reinforcing part is to be formed, the detecting deformation being performed prior to the forming the reinforcing part.

10. The battery reinforcement method according to claim 8, wherein the forming of the reinforcing part being performed such that the reinforcing part spans fully to the edge of the first side of the rectangular external packaging, the first side is a side that is in contact with a device when the battery cell is transferred to or received from the device.

11. The battery reinforcement method according to claim 8, further comprising rounding corners of at least the first side of the rectangular external packaging.

12. The battery reinforcement method according to claim 11, further comprising cutting a portion of at least the first side of the rectangular external packaging.

13. The battery reinforcement method according to claim 1, wherein the forming the reinforcing part is performed after the forming the sealing part.

14. The battery reinforcement method according to claim 1, wherein the sealing part is formed to have a shape that protrudes outward toward an edge of the rectangular external packaging that is different from the edge of the at least one side on which the reinforcing part is formed.

15. The battery reinforcement method according to claim 14, wherein the reinforcing part is formed on one of the four sides of the rectangular external packaging, and the protruding shape of the sealing part protrudes toward the edge of another side of the rectangular external packaging that is opposite the side on which the reinforcing part is formed.

* * * * *